United States Patent
Na et al.

(10) Patent No.: US 12,534,773 B2
(45) Date of Patent: Jan. 27, 2026

(54) HIGH-STRENGTH THICK HOT-ROLLED STEEL SHEET HAVING EXCELLENT ELONGATION AND METHOD FOR MANUFACTURING SAME

(71) Applicant: POSCO CO., LTD, Pohang-si (KR)

(72) Inventors: Hyun-Taek Na, Seoul (KR); Sung-Il Kim, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 346 days.

(21) Appl. No.: 18/025,838

(22) PCT Filed: Sep. 16, 2021

(86) PCT No.: PCT/KR2021/012646
§ 371 (c)(1),
(2) Date: Mar. 10, 2023

(87) PCT Pub. No.: WO2022/065797
PCT Pub. Date: Mar. 31, 2022

(65) Prior Publication Data
US 2023/0349021 A1    Nov. 2, 2023

(30) Foreign Application Priority Data
Sep. 25, 2020   (KR) .................. 10-2020-0124881

(51) Int. Cl.
| | |
|---|---|
| *C21D 9/46* | (2006.01) |
| *C21D 1/18* | (2006.01) |
| *C21D 6/00* | (2006.01) |
| *C21D 8/02* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/26* | (2006.01) |
| *C22C 38/28* | (2006.01) |
| *C22C 38/38* | (2006.01) |

(52) U.S. Cl.
CPC .......... *C21D 9/46* (2013.01); *C21D 1/18* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0278* (2013.01); *C22C 38/001* (2013.01); *C22C 38/002* (2013.01); *C22C 38/02* (2013.01); *C22C 38/04* (2013.01); *C22C 38/06* (2013.01); *C22C 38/26* (2013.01); *C22C 38/28* (2013.01); *C22C 38/38* (2013.01); *C21D 2211/001* (2013.01); *C21D 2211/002* (2013.01); *C21D 2211/005* (2013.01); *C21D 2211/008* (2013.01); *C21D 2211/009* (2013.01)

(58) Field of Classification Search
None
See application file for complete search history.

(56) References Cited

U.S. PATENT DOCUMENTS

| | | |
|---|---|---|
| 2016/0201172 A1 | 7/2016 | Kajihara et al. |
| 2017/0145538 A1 | 5/2017 | Shuto et al. |
| 2018/0073094 A1 | 3/2018 | Bai et al. |
| 2019/0316218 A1 | 10/2019 | Jung |
| 2019/0352736 A1 | 11/2019 | Rijkenberg et al. |
| 2022/0010399 A1 | 1/2022 | Kim et al. |

FOREIGN PATENT DOCUMENTS

| | | |
|---|---|---|
| CN | 103042039 A | 4/2013 |
| CN | 109207695 | 1/2019 |
| EP | 3561101 | 10/2019 |
| EP | 3730659 | 10/2020 |
| EP | 3889304 | 10/2021 |
| JP | H09143570 | 6/1997 |
| JP | H10176239 A | 6/1998 |
| JP | H10298645 A | 11/1998 |
| JP | 2002322541 | 11/2002 |
| JP | 2005264212 A | 9/2005 |
| JP | 2009270171 A | 11/2009 |
| JP | 2015048527 A | 3/2015 |
| JP | 2015203124 | 11/2015 |

(Continued)

OTHER PUBLICATIONS

International Search Report—PCT/KR2021/012646 dated Dec. 8, 2021.
Japanese Office Action—Japanese Application No. 2023-516788 issued on Mar. 26, 2024, citing WO 2020/111702, JP 2015-048527, JP H10-176239, JP H10-298645, WO 2014/115549, US 2018/0073094, and CN 103042039.
Chinese Office Action—Chinese Application No. 202180065476.1 issued on Mar. 12, 2025, citing KR 10-2020-0062422, KR 10-1435319, JP 2005-264212, JP 2009-270171, and JP 2015-203124.

(Continued)

*Primary Examiner* — Anthony M Liang
(74) *Attorney, Agent, or Firm* — CANTOR COLBURN LLP (57) ABSTRACT

Provided are a high-strength thick hot-rolled steel sheet having excellent elongation and a method for manufacturing same. The high-strength thick hot-rolled steel sheet comprises, by weight %: 0.05-0.15% of C; 0.01-1.0% of Si; 1.0-2.0% of Mn; 0.01-0.1% of Sol. Al; 0.005-1.0% of Cr; 0.001-0.02% of P; 0.001-0.01% of S; 0.001-0.01% of N; 0.005-0.07% of Nb; 0.005-0.11% of Ti; and the remainder of Fe and unavoidable impurities, satisfies relation 1, and has a microstructure comprising, by area %: 25-50% of polygonal ferrite; 30-50% of bainitic ferrite and acicular ferrite; 20% or less of bainite; less than 5% of the sum of area fractions of carbide and pearlite structures having a diameter of 0.5 μm or more, observed within a unit area (1 cm$^2$); and less than 5% of phase MA (martensitic-austenitic constituents).

6 Claims, 2 Drawing Sheets

(56) References Cited

FOREIGN PATENT DOCUMENTS

| | | | |
|---|---|---|---|
| KR | 20130071705 | | 7/2013 |
| KR | 20130107170 A | | 10/2013 |
| KR | 101435319 B1 | | 8/2014 |
| KR | 20170015471 | | 2/2017 |
| KR | 20180071684 A | | 6/2018 |
| KR | 20180071866 | | 6/2018 |
| KR | 20190076758 | | 7/2019 |
| KR | 102119975 | | 6/2020 |
| KR | 20200062422 | | 6/2020 |
| WO | 2014115549 A1 | | 7/2014 |
| WO | 2019124890 A1 | | 6/2019 |
| WO | WO-2019124945 A1 * | 6/2019 | ............... C21D 6/00 |
| WO | 2020111702 A1 | | 6/2020 |

OTHER PUBLICATIONS

Chinese Notice of Allowance—Chinese Application No. 202180065476.1 issued on Jul. 28, 2025, citing KR 10-2013-0107170.

European Search Report—European Application No. 21872826.9 issued on Jun. 27, 2025, citing WO 2020/111702, KR 10-2018-0071684, US 2019/0316218, US 2019/0352736, and WO 2019/124890.

* cited by examiner

HIGH-STRENGTH THICK HOT-ROLLED STEEL SHEET HAVING EXCELLENT ELONGATION AND METHOD FOR MANUFACTURING SAME

TECHNICAL FIELD

The present disclosure relates to a method for manufacturing a high-strength hot-rolled steel sheet having a thickness of 10 to 14 mm, mainly used in structural members such as wheel discs, wheel rims, members, and frames of commercial vehicles, and more particularly, to a high-strength thick hot-rolled steel sheet, which is characterized by having a tensile strength of 590 MPa or more, an excellent elongation of 30% or more, and no crack occurrence in molding of parts such as wheel discs, and a method for manufacturing the same.

BACKGROUND ART

Conventionally, as the structural members of commercial vehicles and heavy equipment, sheet materials having a thickness of 13 to 20 mm and a tensile strength of 440 MPa or more are mainly used, but in recent years, a technology of using high-strength steel materials having a tensile strength of 590 MPa or more and a thickness of 10 to 15 mm is being developed, for the thinning of high-strength steel materials for weight reduction. However, when a transformation structure is used during manufacturing the high-strength thick hot-rolled steel sheet as such in a hot rolling process, it is difficult to secure a microstructure which is uniform in a thickness direction. Therefore, it is difficult to secure stable ductility and a yield strength, cracks may occur easily during manufacturing of parts, and an endurance lifespan may be poor due to the occurrence of local stress concentration during use.

In this regard, a technology of subjecting a conventional steel material to usual austenite region hot rolling and then coiling the steel material at a high temperature to form fine precipitates in a ferrite phase as a matrix structure to secure strength and ductility (Patent Document 1); performing rolling so that a coarse pearlite structure is not formed, performing cooling by a 2-stage cooling process to lower a coiling temperature to a temperature at which a bainite phase is formed, and performing coiling (Patent Document 2); and the like, were suggested. In addition, a technology of refining austenite crystal grains by using Ti, Nb, and the like in large reduction to 40% or more in a non-recrystallization region during hot rolling (Patent Document 3) was suggested.

However, alloy components such as Si, Mn, Al, Mo, and Cr, which are mainly used in the above technologies for manufacturing a thick high-strength steel, are effective for improving strength, but when the alloy components are excessively added, segregation and non-uniformity of microstructure is rather caused to deteriorate moldability. In addition, fine cracks occurring on a shear plane propagate easily in a fatigue environment to cause breakage of parts. In particular, as the thickness is larger, microstructure non-uniformity between a surface layer part and a central part of the thickness is increased, so that local stress concentration is increased and a crack propagation speed in a fatigue environment is also increased, thereby deteriorating durability.

In addition, it is effective to use precipitate forming elements such as Ti, Nb, and V for refining crystal grains of a thick material and obtaining precipitation strengthening effect. However, coiling at a high temperature of 500 to 700° C. at which it is easy to form precipitates or without controlling a cooling rate of a steel sheet during cooling after hot rolling, a coarse carbide is formed in a thickness center of the thick material to deteriorate shear plane quality.

Further, when a coiling temperature is cooled to a temperature at which a bainite phase is formed so that a coarse pearlite structure is not formed, a two-stage cooling control method is limited by the length of ROT section, and as a single weight requested by a customer company is smaller, there is a limit to obtaining the effect over the entire coil length. In addition, an equipment load is high for controlling a cooling rate value to a level of 70° C./sec in first cooling, which is directly related to poor productivity. Further, applying a large reduction of 40% to a non-recrystallization region during hot rolling deteriorates the shape quality of a rolled sheet to cause a load in equipment, and thus, it is difficult to apply it in practice.

RELATED ART DOCUMENT (Patent Document 1) Japanese Patent Laid-Open Publication No. 2002-322541

(Patent Document 2) Korean Patent Laid-Open Publication No. 10-2020-0062422

(Patent Document 3) Japanese Patent Laid-Open Publication No. 1997-143570

DISCLOSURE

Technical Problem

An object of the present disclosure is to provide a thick hot-rolled steel sheet having a constant hardness distribution in the thickness direction and excellent strength and ductility by controlling steel composition components, hot rolling, and cooling conditions to secure a uniform distribution of a microstructure in the thickness direction of a steel material, and a method for manufacturing the same.

An object of the present disclosure is not limited to the above description. The object of the present disclosure will be understood from the entire content of the present specification, and a person skilled in the art to which the present disclosure pertains will understand an additional object of the present disclosure without difficulty.

Technical Solution

According to an aspect of the present disclosure, a high-strength thick hot-rolled steel sheet having a thickness of 10 to 14 mm, a tensile strength of 590 MPa grade or higher, and an elongation of 30% or more includes, by weight:
  0.05 to 0.15% of C, 0.01 to 1.0% of Si, 1.0 to 2.0% of Mn, 0.01 to 0.1% of Sol. Al, 0.005 to 1.0% of Cr, 0.001 to 0.02% of P, 0.001 to 0.01% of S, 0.001 to 0.01% of N, 0.005 to 0.07% of Nb, and 0.005 to 0.11% of Ti, with a remainder of Fe and unavoidable impurities, wherein the steel sheet satisfies the following Relation 1, and
  has a microstructure including, by area: 25 to 50% of polygonal ferrite, 30 to 50% of bainitic ferrite+acicular ferrite, 20% or less of bainite, less than 5% of the sum of area fractions of a pearlite structure and a carbide having a diameter of 0.5 μm or more, observed within a unit area (1 cm$^2$), and less than 5% of a MA phase (martensitic-austenitic constituents):

$0.3 \leq R \leq 1.0$ and $R=[C]^*+0.7\times[Mn]+8.5\times[P]+7.5\times[S]-0.9\times[Si]-1.5\times[Nb]$ $[C]^*=[C]-[C]\times Q$ $Q=([Nb]/93+[Ti]/48)/([C]/12)$ [Relation 1]

wherein C, Mn, P, S, Si, Nb, and Ti are wt % of corresponding alloy elements.

The hot-rolled steel sheet may have a value of $El\times TS\times 0.5$ $Hv_{max}/\Delta H$ of 140,000 or more.

According to another aspect of the present disclosure, a method for manufacturing a high-strength thick hot-rolled steel sheet having a thickness of 10 to 14 mm, a tensile strength of 590 MPa grade or higher, and an elongation of 30% or more includes:
reheating a steel slab satisfying the composition components and the following Relation 1 to 1200 to 1350° C.;
finish hot rolling the reheated steel slab in a temperature range satisfying the following Relation 2;
cooling the finish hot-rolled steel sheet to a temperature in a range of 450 to 550° C. at a cooling rate satisfying the following Relation 3 and then coiling the steel sheet at a temperature in a range of 400 to 550° C.; and
air cooling or water cooling the coiled steel sheet to a temperature in a range of room temperature to 200° C.:

$0.3 \leq R \leq 1.0$ and $R=[C]^*+0.7\times[Mn]+8.5\times[P]+7.5\times[S]-0.9\times[Si]-1.5\times[Nb]$ $[C]^*=[C]-[C]\times Q$ $Q=([Nb]/93+[Ti]/48)/([C]/12)$ [Relation 1]

wherein C, Mn, P, S, Si, Nb, and Ti are wt % of corresponding alloy elements, $Tn-70 \leq FDT \leq Tn$ $Tn=750+92\times[C]+70\times[Mn]+45\times[Cr]+647\times[Nb]+515\times[Ti]-50\times[Si]-2.4\times(t-5)$ [Relation 2]

wherein C, Mn, Cr, Nb, Ti, and Si are wt % of corresponding alloy elements,
FDT is a temperature (° C.) of a hot-rolled sheet at the end of hot rolling, and
t is a thickness (mm) of a final rolled sheet material, $CR_{Min} \leq CR^* \leq 60$ $CR_{Min}=65-157\times[C]-25.2\times[Si]-14.1\times[Mn]-27.3\times[Cr]+61\times[Ti]+448\times[Nb]+1.4\times(t-5)$ [Relation 3]

wherein C, Si, Mn, Cr, Ti, and Nb are wt % of corresponding alloy elements, and
CR* is a cooling rate (° C./sec) during cooling of a sheet material rolled after hot rolling.

After the air cooling or the water cooling, pickling and oiling the steel sheet may be further included.

Advantageous Effects

The present disclosure having the configuration as described above may provide a high-strength thick hot-rolled steel sheet which has a microstructure including: 25 to 50% by area of polygonal ferrite, 30 to 50% by area of bainitic ferrite and acicular ferrite, 20% by area or less of bainite, less than 5% by area of the sum of area fractions of a pearlite structure and a carbide having a diameter of 0.5 µm or more, observed within a unit area (1 cm²), and less than 5% by area of a MA phase (martensitic-austenitic constituents), has a thickness of 10 to 14 mm, a tensile strength of 590 MPa grade or higher, and an elongation of 30% or more, and satisfies that the value of $El\times TS\times 0.5$ $Hv_{max}/\Delta H$ is 140,000 or more.

BEST MODE FOR INVENTION

Hereinafter, the present disclosure will be described.

The present inventors studied a detailed material change and a microstructure distribution by the thickness direction depending on the components and hot rolling and cooling conditions, for thick rolled steel materials having microstructures having various components different from each other, and from the results, searched a way to allow the thick hot-rolled steel sheet to have excellent strength and ductility. In particular, the present inventors confirmed that when Relations 1 to 3 are derived and a thick high-strength steel having a thickness of 10 to 14 mm is manufactured based on the relations, uniformity of a microstructure in the thickness direction is secured so that a hardness distribution in the thickness direction is constant, and the value of $El\times TS\times 0.5$ $Hv_{max}/\Delta H$ satisfies 140,000 or more, and suggested the present invention.

The high-strength thick hot-rolled steel sheet of the present disclosure includes, by weight: 0.05 to 0.15% of C, 0.01 to 1.0% of Si, 1.0 to 2.0% of Mn, 0.01 to 0.1% of Sol. Al, 0.005 to 1.0% of Cr, 0.001 to 0.02% of P, 0.001 to 0.01% of S, 0.001 to 0.01% of N, 0.005 to 0.07% of Nb, and 0.005 to 0.11% of Ti, with a remainder of Fe and unavoidable impurities, wherein the steel sheet satisfies the following Relation 1, and has a steel microstructure including, by area: 25 to 50% of polygonal ferrite, 30 to 50% of bainitic ferrite+acicular ferrite, 20% or less of bainite, less than 5% of the sum of area fractions of a pearlite structure and a carbide having a diameter of 0.5 µm or more, observed within a unit area (1 cm²), and less than 5% of a MA phase (martensitic-austenitic constituents).

Hereinafter, the steel composition components of the present disclosure and the reasons for limiting the component contents will be described, and "%" used herein refers to "wt %".

C: 0.05 to 0.15%

C is a most economical and effective element for strengthening steel, and when the added amount is increased, a precipitation strengthening effect or a bainite phase fraction is increased to increase tensile strength. In addition, when the thickness of a hot-rolled steel is increased, the cooling rate in the thickness center is lowered during cooling after hot rolling, and thus, when a C content is high, a coarse carbide or pearlite is easily formed. Therefore, when the content is less than 0.05%, it is difficult to obtain a sufficient strengthening effect, and when the content is more than 0.15%, formability is deteriorated and durability is reduced due to the formation of a band structure and a coarse carbide or a pearlite phase in the thickness center, and furthermore, weldability is deteriorated. Therefore, it is preferred in the present disclosure that the C content is limited to 0.05 to 0.15%. More preferably, the C content is limited to the range of 0.06 to 0.12%.

Si: 0.01 to 1.0%

Since Si deoxidizes molten steel, has an effect of solid solution strengthening, and delays the formation of a coarse carbide, it is favorable for improving formability. However, when the content is less than 0.01%, a solid solution strengthening effect is small and an effect of delaying the formation of a carbide is also small, and thus, it is difficult to improve formability. However, when the Si content is more than 1.0%, a phase transformation temperature is raised so that coarse grains are easily formed by local ferrite region rolling on the surface layer part during low temperature region hot rolling of an ultra-thick material and a red scale is formed on the surface of a steel sheet to greatly deteriorate steel sheet surface quality and reduce ductility and also weldability. Therefore, it is preferred in the present disclosure that the Si content is limited to the range of 0.01 to 1.0%. More preferably, the Si content is limited to the range of 0.1 to 0.9%.

Mn: 1.0 to 2.0%

Mn is an element effective for solid solution strengthening of steel, like Si, and increases the hardenability of steel to facilitate the formation of a bainite phase during cooling after hot rolling. However, when the content is less than 1.0%, the effect by the addition may not be obtained, and when the content is more than 2.0%, hardenability is greatly increased so that martensite phase transformation easily occurs, and pearlite formation is promoted in coiling at a high temperature. In addition, a segregation part develops greatly in the thickness center during slab casting in a continuous casting process, and a microstructure in the thickness direction is non-uniformly formed during cooling after hot rolling, so that formability and durability are deteriorated. Therefore, it is preferred in the present disclosure that the Mn content is limited to the range of 1.0 to 2.0%. More preferably, the Mn content is limited to the range of 1.1 to 2.0%.

Cr: 0.005 to 1.0%,

Cr solid-strengthens steel and delays ferrite phase transformation during cooling to help formation of bainite. However, when the content is less than 0.005%, the effect by the addition may not be obtained, and when the content is more than 1.0%, ferrite transformation is excessively delayed, so that an elongation is deteriorated due to the formation of a martensite phase. In addition, a segregation part in the thickness center greatly develops, like Mn, and a microstructure in the thickness direction becomes non-uniform to deteriorate formability and durability. Therefore, it is preferred in the present disclosure that the Cr content is limited to the range of 0.005 to 1.0%. More preferably, the Cr content is limited to the range of 0.1 to 0.9%.

P: 0.001 to 0.02%

P has both a solid solution strengthening effect and a ferrite transformation promotion effect, like Si. However, manufacturing costs are high for controlling the content to less than 0.001%, which is economically unfavorable and is insufficient for obtaining strength. However, when the content is more than 0.02%, brittleness occurs by grain boundary segregation, fine cracks may easily occur during forming, and formability and durability are greatly deteriorated. Therefore, it is preferred in the present disclosure that the P content is limited to the range of 0.001 to 0.02%.

S: 0.001 to 0.01%

S is an impurity present in steel, and when the content is more than 0.01%, it is bonded to Mn and the like to form a non-metal inclusion, so that fine cracks may easily occur in cut processing of steel, and formability and durability are greatly deteriorated. However, in order to control the content to less than 0.001%, it takes much time for steelmaking, which may deteriorate productivity. Therefore, it is preferred in the present disclosure that the S content is limited to 0.001 to 0.01%.

Sol. Al: 0.01 to 0.1%

Sol. Al is a component which is mainly added for deoxidation, and when the content is less than 0.01%, the addition effect is insufficient, and when the content is more than 0.1%, it is bonded to nitrogen to form AlN, so that corner cracks may easily occur in a slab during continuous casting and defects by inclusion formation occur easily. Therefore, it is preferred in the present disclosure that the Sol. Al content is limited to 0.01 to 0.1%.

N: 0.001 to 0.01%

N is a representative solid solution strengthening element with C, and forms coarse precipitates with Ti, Al, and the like. Generally, the solid solution strengthening effect of N is better than that of carbon, but as the amount of N in steel is increased, the toughness is greatly deteriorated. In addition, in order to control the content to less than 0.001%, it takes much time for steelmaking, which deteriorates productivity. Therefore, considering this, it is preferred in the present disclosure that the N content is limited to 0.001 to 0.01%.

Ti: 0.005 to 0.11%

Ti is a representative precipitation strengthening element, and forms coarse TiN in steel with strong affinity with N. TiN has an effect of suppressing crystal grain growth during a heating process for hot rolling. In addition, Since Ti remaining after a reaction with nitrogen is solid-solubilized in steel and bonded to carbon to form a TiC precipitate, it is a component useful for improving steel strength. When the Ti content is less than 0.005%, the effect may not be obtained, and when the Ti content is more than 0.11%, local stress concentration is caused during forming due to the occurrence of coarse TiN and precipitate coarsening, so that cracks may easily occur. Therefore, it is preferred in the present disclosure that the Ti content is limited to 0.005 to 0.11%. More favorably, the Ti content is limited to 0.01 to 0.1%.

Nb: 0.005 to 0.07%

Nb is a representative precipitation strengthening element with Ti, and performs precipitation during hot rolling, and thus, it is effective for improving steel strength and impact toughness due to the crystal grain refining effect by recrystallization delay. When the Nb content is less than 0.005%, the effect may not be obtained, when the Nb content is more than 0.07%, formability and durability are deteriorated by elongated crystal grain formation and coarse composite precipitate formation by excessive recrystallization delay during hot rolling. Therefore, it is preferred in the present disclosure that the Nb content is limited to 0.005 to 0.07%. More favorably, the Nb content is limited to 0.01 to 0.07%.

Relation 1

The present disclosure is characterized by controlling the contents of C, Mn, P, S, Si, Nb, and Ti so that the R value defined by the following Relation 1 satisfies a range of 0.3 to 1.0.

The reason for setting Relation 1 as such in the present disclosure is to suppress the formation of segregation in the thickness direction, a coarse carbide, and a non-uniform pearlite structure of a rolled sheet by minimizing segregation of C, Mn, P, S, and the like and MnS formation which occur during solidification of steel and cooling of a slab in a continuous casting process, thereby improving the uniformity of a microstructure. When the R value defined by Relation 1 is less than 0.3, fractions of segregation in the thickness direction, a coarse carbide, and a non-uniform pearlite structure are rapidly decreased, but the strength level suggested in the present disclosure may not be secured, and when the R value is more than 1.0, a pearlite structure is excessively formed in the center of the microstructure of the rolled sheet, or non-uniformity of the microstructure in the thickness direction is increased by the formation of unnecessary segregation and a coarse carbide.

$0.3 \leq R \leq 1.0$ $R=[C]^*+0.7\times[Mn]+8.5\times[P]+7.5\times[S]-0.9\times[Si]-1.5\times[Nb]$ $[C]^*=[C]-[C]\times Q$ $Q=([Nb]/93+[Ti]/48)/([C]/12)$ [Relation 1]

wherein C, Mn, P, S, Si, Nb, and Ti are wt % of corresponding alloy elements.

The remaining component of the present disclosure is iron (Fe). However, since in the common manufacturing process, unintended impurities may be inevitably incorporated from raw materials or the surrounding environment, the component may not be excluded. Since these impurities are known to any person skilled in the common manufacturing process, the entire contents thereof are not particularly mentioned in the present specification.

In addition, the high-strength thick hot-rolled steel sheet of the present disclosure has a steel microstructure including, by area: 25 to 50% of polygonal ferrite, 30 to 50% of bainitic ferrite+acicular ferrite, 20% or less of bainite, less than 5% of the sum of area fractions of a pearlite structure and a carbide having a diameter of 0.5 μm or more, observed within a unit area (1 cm$^2$), and less than 5% of a MA phase (martensitic-austenitic constituents).

In the present disclosure, when the fraction of polygonal ferrite which is a high temperature ferrite structure is less than 25%, sufficient ductility may not be secured, and when the fraction is more than 50%, an appropriate fraction of a low temperature phase including bainitic ferrite is not secured, and strength and durability are deteriorated by coarsening of a microstructure and an increase in a grain boundary carbide fraction, resulting from a relatively slow cooling rate.

In addition, in the present disclosure, the sum of the fractions of bainitic ferrite and acicular ferrite is limited to a range of 30 to 50%, and when the content is more than 50%, a sufficient polygonal ferrite structure is not secured to deteriorate ductility. In addition, most of all, for a thick material having a thickness of 10 to 14 mm, in order to control a cooling rate and a coiling temperature for securing more than 50% of bainitic ferrite or the like, equipment limitation is large considering cooling equipment and the length of a ROT section, which is directly related to decreased productivity. However, when the sum of the fractions is less than 30%, polygonal ferrite and a pearlite structure is unnecessarily formed, or the fractions of low temperature phases such as bainite and martensite are rapidly increased, but in this case also, strength, ductility, and durability are deteriorated.

In addition, in the present disclosure, the fraction of bainite is limited to 20% or less, and when it is more than 20%, the fraction of polygonal ferrite in the structure is rapidly decreased, so that ductility is unnecessarily deteriorated.

Meanwhile, in the present disclosure, the sum of the area fractions of a pearlite structure and a carbide having a diameter of 0.5 μm or more, observed within a unit area (1 cm$^2$) is limited to less than 5% and a MA phase (martensitic-austenitic constituents) is limited to less than 5%, and the limitations are for suppressing the fraction of the MA phase which locally increases a strain by excessive concentration of carbon and forming appropriate ratios of bainite and bainitic ferrite instead to improve ductility and durability by deriving uniform deformation behavior in the thickness direction.

The hot-rolled steel sheet having the steel composition components and the steel microstructure as described above, which has a thickness of 10 to 14 mm, a tensile strength of 590 MPa grade or higher, and an elongation of 30% or more, forms a uniform structure in the thickness direction, thereby satisfying that the value of $El \times TS \times 0.5\ Hv_{max}/\Delta H$ which is related to elongation, strength, and material uniformity is 140,000 or more.

Next, the method for manufacturing a high-strength hot-rolled steel sheet of the present disclosure will be described in detail.

In the present disclosure, only when the steel composition components satisfy the following Relation 1 and a steel manufacturing process satisfies both the following Relations 2 and 3, the appropriate strength, ductility, and material uniformity of steel may be secured. This may be effectively achieved by minimizing segregation of C, Mn, P, S, and the like and the formation of MnS, which occurs during solidification of steel and cooling of a slab in a continuous casting process.

Since the delay in recrystallization during hot rolling refines the structure during phase transformation and promotes ferrite phase transformation, it contributes to securing uniform yield strength and formability in the thickness direction. In addition, an untransformed phase is decreased to decrease the fractions of a coarse MA phase and a martensite phase, and a coarse carbide or a pearlite structure are decreased in the thickness center where a cooling rate is relatively low, thereby eliminating a non-uniform structure of the hot-rolled steel sheet.

However, it is difficult to homogenize the microstructure in the thickness center of the thick material having a thickness of 10 to 14 mm by common hot rolling, and when hot rolling is performed at an excessively low temperature for obtaining an effect of recrystallization delay in the thickness center, a deformed structure strongly develops at a t/4 position from directly below the rolled sheet thickness surface layer to rather increase microstructure phase non-uniformity with the thickness center, so that fine cracks may easily occur in a non-uniform area during forming and ductility is decreased. Therefore, as shown in the following Relation 2, a finish hot rolling temperature is controlled between a Tn temperature and Tn-70, the Tn temperature being a recrystallization delay start temperature, so as to be appropriate fora thick material, and the effect may be obtained only by completion by applying a total reduction amount of 10 to 60% in the section from Tn to a finish hot rolled temperature. Here, when the total reduction amount is less than 10%, it is difficult to obtain the recrystallization delay effect, so that non-uniform coarse grains are easily formed, and when the total reduction amount is more than 60%, an excessively elongated microstructure is formed, and thus, when a carbide is formed along the grain boundary in the microstructure, and cracks occurs easily along the grain boundary during forming. In addition, fine precipitates are decreased to decrease a precipitation strengthening effect.

In addition, since a cooling rate in the thickness center during cooling after hot rolling is lower than that in the thickness surface layer part of the rolled sheet, a coarse ferrite phase and a coarse carbide are formed to have a non-uniform microstructure. Therefore, cooling should be performed faster than a specific cooling rate ($CR_{min}$) so that the cooling rate of the following Relation 3 is not excessively maintained in the ferrite phase transformation region in the thickness center during cooling of a rolled sheet directly after hot rolling. In addition, CT which is a cooling end temperature may be limited to 400 to 550° C. to suppress the formation of a coarse ferrite phase and a coarse carbide, and also to minimize the formation of a MA phase and martensite.

The method for manufacturing a high-strength thick hot-rolled steel sheet of the present disclosure includes: reheating a steel slab satisfying the composition components and Relation 1 to 1200 to 1350° C.; finish hot rolling the reheated steel slab in a temperature range satisfying Relation 2; cooling the finish hot rolled steel sheet to a temperature in a range of 450 to 550° C. at a cooling rate satisfying Relation 3 and then coiling the steel sheet at a temperature in a range of 400 to 550° C.; and air cooling or water cooling the coiled steel sheet to a temperature in a range of room temperature to 200° C.

First, in the present disclosure, a steel slab satisfying the composition components and Relation 1 is reheated to 1200 to 1350° C.

Here, when the reheating temperature is lower than 1200° C., precipitates are not sufficiently solid-solubilized again, so that the formation of precipitates is decreased in a process after hot rolling and coarse TiN remains. However, when the temperature is higher than 1350° C., strength may be decreased by abnormal grain growth of austenite crystal grains. Taking this into account, it is preferred in the present disclosure that the reheating temperature is limited to the range of 1200 to 1350° C.

Subsequently, in the present disclosure, the reheated steel slab is finish hot rolled in a temperature range satisfying Relation 2.

In the present disclosure, it is preferred that the hot rolling start temperature is 1150° C. or lower, and considering the microstructure of steel, the finish hot rolling temperature satisfies Relation 2. When hot rolling starts at a temperature higher than 1150° C., the temperature of the hot-rolled steel sheet is raised, so that a crystal grain size coarsens and the surface quality of the hot-rolled steel sheet is deteriorated.

In particular, in the present disclosure, when rolling is finished at a temperature higher than Tn which is suggested in Relation 2, the microstructure of steel becomes coarse and non-uniform. In addition, when rolling is finished at a temperature lower than Tn−70, the fraction of a fine ferrite phase is increased due to the ferrite phase transformation promotion in a surface layer part where the temperature is relatively low in the thick high-strength steel having a thickness of a steel sheet corresponding to 10 to 14 mm, but the steel sheet has an elongated crystal grain shape, so that cracks propagate rapidly. In addition, a non-uniform microstructure may remain in the thickness center, which is unfavorable to durability.

In addition, in the present disclosure, the effect may be exhibited only by applying a reduction amount of 10 to 60% within the finish hot rolling temperature range. When the reduction amount is less than 10%, it is difficult to show a recrystallization delay effect, so that non-uniform coarse grains are easily formed. However, when the reduction amount is more than 60%, an excessively elongated microstructure is formed, and when a carbide is formed along the grain boundary in the microstructure, cracks may easily occur along the grain boundary during forming. In addition, fine precipitates are decreased to decrease a precipitation strengthening effect.

[Relation 2]

$$Tn-70 \leq FDT \leq Tn$$

$$Tn=750+92\times[C]+70\times[Mn]+45\times[Cr]+647\times[Nb]+515\times[Ti]-50\times[Si]-2.4\times(t-5) \quad \text{[Relation 2]}$$

wherein C, Mn, Cr, Nb, Ti, and Si are wt % of corresponding alloy elements,

FDT is a temperature (° C.) of a hot-rolled sheet at the end of hot rolling, and t is a thickness (mm) of a final rolled sheet material, Subsequently, in the present disclosure, the finish hot rolled steel sheet is cooled to a temperature in a range of 450 to 550° C. at a cooling rate satisfying the following Relation 3, and then the cooled steel sheet is coiled at a temperature in a range 400 to 550° C.

A temperature range from FDT which is a temperature immediately after the hot rolling to CT which is a cooling end temperature corresponds to a temperature section in which ferrite phase transformation occurs during cooling, and since the cooling rate in the thickness center is lower than in the thickness surface layer part of the rolled sheet, a coarse ferrite phase and a coarse carbide are formed in the thickness center to have a non-uniform microstructure. Therefore, cooling should be performed faster than a specific cooling rate ($CR_{min}$) to suppress this. In addition, when the average cooling rate of the surface layer part (range to 1-2 mm in the thickness direction from a steel sheet surface) of the hot-rolled steel sheet in the temperature range is higher than 60° C./sec, a difference in the cooling rates between the surface layer part and a central part is too large, so that a difference in hardness between the surface layer part and the central part is greatly increased to deteriorate formability and durability, and also, in terms of equipment, the implementation is difficult in slab operation in small weighted and an equipment load due to extremely strong cooling in the whole step. Therefore, as shown in the following Relation 3, cooling should be performed so that the cooling rate which is set considering the steel components is satisfied.

In addition, in the present disclosure, when the coiling temperature is higher than 550° C., a pearlite phase is formed of a band structure or a large amount of coarse carbides is formed, so that the formability and the durability of steel are insufficient, and when the temperature is lower than 400° C., a martensite phase and a MA phase are excessively formed to deteriorate the formability and the durability. Therefore, it is preferred in the present disclosure that the coiling temperature is limited to 450 to 550° C.

$CR_{min} \leq CR^* \leq 60$ $CR_{min}=65-157\times[C]-25.2\times[Si]-14.1\times[Mn]-27.3\times[Cr]+61\times[Ti]+448\times[Nb]+1.4\times(t-5)$ [Relation 3]

wherein C, Si, Mn, Cr, Ti, and Nb are wt % of corresponding alloy elements, and

CR* is a cooling rate (° C./sec) during cooling of a sheet material rolled after hot rolling.

Further, in the present disclosure, the coiled hot-rolled steel sheet is air cooled or water cooled to a temperature in a range of room temperature to 200° C.

The air cooling of a steel sheet refers to cooling in the air at room temperature at a cooling rate of 0.001 to 10° C./hour. Here, even in the case in which the cooling rate is more than 10° C./hour, when the coiling temperature and cooling conditions are met, transformation of some untransformed phases into a MA phase in steel may be suppressed, and thus, water cooling may be performed. Here, the water cooling refers to cooling by charging a coil into a water bath at room temperature. In addition, it is economically unfavorable to control the cooling rate to less than 0.001° C./hour, since separate heating equipment and insulation equipment are needed.

Subsequently, in the present disclosure, after the air cooling or water cooling, the steel sheet may be pickled and oiled to manufacture a pickled and oiled steel sheet.

The high-strength thick hot-rolled steel sheet having a thickness of 10 to 14 mm of the present disclosure which is manufactured using the manufacturing process as described above has a steel microstructure including, by area: 25 to 50% of polygonal ferrite, 30 to 50% of bainitic ferrite+acicular ferrite; 20% or less of bainite, less than 5% of the sum of area fractions of a pearlite structure and a carbide having a diameter of 0.5 μm or more, observed within a unit area (1 cm$^2$), and less than 5% of a MA phase (martensitic-austenitic constituents), and has a tensile strength of 590 MPa grade or higher and an elongation of 30% or more.

In addition, the hot-rolled steel sheet of the present disclosure may have a value of El×TS×0.5 Hv$_{max}$/ΔH of 140,000 or more.

Mode for Invention

Hereinafter, the present disclosure will be described in detail by way of the examples.

EXAMPLES

Steel slab compositions having the component compositions as shown in the following Table 1 of the present disclosure were prepared, respectively. Further, each of the steel slabs prepared above was manufactured into a hot-rolled steel sheet, using manufacturing process conditions such as a rolling thickness, a finish hot rolling temperature (FDT), a coiling temperature (CT), a reduction amount (%) applied in a temperature range of Tn or lower and Tn−70 or higher which is a non-recrystallization temperature range, and a cooling rate (CR) to a coiling temperature which is a cooling end temperature after finish hot rolling, as shown in the following Table 2. Meanwhile, the cooling rate of the steel sheet after coiling which is not shown in Table 2 was set to 1° C./hour constantly.

Further, microstructure phase fractions in the surface layer part (1 mm directly below the surface) and in the thickness center (2/t) of the hot-rolled steel sheets manufactured above were measured and are shown in the following Table 3. Meanwhile, the area fractions of the MA phase were the results of analyzing at a magnification of 1000 times using an optical microscope and an image analyzer after etching a Lepera etching method. In addition, the phase fractions of martensite (M), polygonal ferrite (PF), bainitic ferrite (BF), acicular ferrite (AF), bainite (B), and pearlite (P) were measured from the results of analyzing at magnifications of 3000 times and 5000 times using a scanning electron microscope (SEM), after etching using a Nital etching solution.

In addition, mechanical properties, hardness, and the like of the hot-rolled steel sheets manufactured above were measured, and the results are shown in the following Table 4. Here, YS, TS, YR, and El refer to 0.2% off-set yield strength, tensile strength, a yield ratio, and an elongation at break, and are the results of collecting a JIS No. 5 standard specimen parallel to a rolling direction and testing the specimen.

Meanwhile, the hardness was measured as a Vickers hardness value, measured in the thickness direction at 0.5 mm interval from the surface layer part (1 mm directly below the surface) to a thickness of ½t by a Micro-vickers tester, and a load of 500 g was applied at this time. Here, the highest Vickers hardness value measured is defined as H$_{max}$, the lowest hardness value is defined as H$_{min}$, and ΔHv refers to H$_{max}$−H$_{min}$

TABLE 1

| Steel No. | Steel composition components (wt %) | | | | | | | | | | Relation 1 | Remarks |
|---|---|---|---|---|---|---|---|---|---|---|---|---|
| | C | Si | Mn | Cr | Al | P | S | N | Ti | Nb | | |
| 1 | 0.16 | 0.2 | 1.5 | 0.32 | 0.03 | 0.01 | 0.003 | 0.004 | 0.07 | 0.032 | 1.05 | Comparative steel 1 |
| 2 | 0.08 | 1.2 | 1.7 | 0.35 | 0.03 | 0.01 | 0.003 | 0.004 | 0.06 | 0.025 | 0.24 | Comparative steel 2 |
| 3 | 0.07 | 0.5 | 2.5 | 0.22 | 0.0 | 0.01 | 0.003 | 0.004 | 0.07 | 0.034 | 1.40 | Comparative steel 3 |
| 4 | 0.08 | 0.5 | 0.8 | 0.36 | 0.03 | 0.01 | 0.003 | 0.004 | 0.05 | 0.035 | 0.23 | Comparative steel 4 |
| 5 | 0.07 | 0.3 | 1.5 | 0.22 | 0.03 | 0.01 | 0.004 | 0.004 | 0.05 | 0.025 | 0.91 | Inventive steel 1 |
| 6 | 0.07 | 0.3 | 1.5 | 0.25 | 0.03 | 0.01 | 0.005 | 0.004 | 0.05 | 0.005 | 0.95 | Inventive steel 2 |
| 7 | 0.09 | 0.3 | 1.4 | 0.21 | 0.03 | 0.01 | 0.004 | 0.005 | 0.04 | 0.033 | 0.85 | Inventive steel 3 |
| 8 | 0.09 | 0.3 | 1.4 | 0.19 | 0.03 | 0.01 | 0.004 | 0.005 | 0.04 | 0.033 | 0.85 | inventive steel 4 |
| 9 | 0.08 | 0.4 | 1.5 | 0.72 | 0.03 | 0.01 | 0.003 | 0.006 | 0.04 | 0.045 | 0.79 | Inventive steel 5 |

TABLE 1-continued

| Steel No. | Steel composition components (wt %) | | | | | | | | | | Relation 1 | Remarks |
|---|---|---|---|---|---|---|---|---|---|---|---|---|
| | C | Si | Mn | Cr | Al | P | S | N | Ti | Nb | | |
| 10 | 0.06 | 0.3 | 1.6 | 0.35 | 0.03 | 0.01 | 0.003 | 0.005 | 0.09 | 0.032 | 0.94 | Inventive steel 6 |
| 11 | 0.06 | 0.3 | 1.3 | 0.55 | 0.03 | 0.01 | 0.003 | 0.005 | 0.04 | 0.043 | 0.73 | Inventive steel 7 |
| 12 | 0.08 | 0.4 | 1.5 | 0.005 | 0.03 | 0.01 | 0.003 | 0.005 | 0.005 | 0.045 | 0.80 | Inventive steel 8 |
| 13 | 0.07 | 0.5 | 1.5 | 0.43 | 0.03 | 0.01 | 0.003 | 0.005 | 0.06 | 0.051 | 0.68 | Inventive steel 9 |
| 14 | 0.09 | 0.3 | 1.6 | 0.81 | 0.03 | 0.01 | 0.002 | 0.004 | 0.09 | 0.045 | 0.94 | Inventive steel 10 |
| 15 | 0.09 | 0.2 | 1.4 | 0.63 | 0.03 | 0.01 | 0.003 | 0.004 | 0.09 | 0.045 | 0.90 | Inventive steel 11 |
| 16 | 0.11 | 0.5 | 1.5 | 0.72 | 0.03 | 0.01 | 0.003 | 0.004 | 0.09 | 0.055 | 0.71 | Inventive steel 12 |

TABLE 2

| Classification | Thickness (mm) | FDT(° C.) | Reduction amount (%) | CT(° C.) | CR (° C./s) | Relation 2 | | Relation 3 | Remarks |
|---|---|---|---|---|---|---|---|---|---|
| | | | | | | Tn | Tn − 70 | CRmin | |
| Comparative Steel 1 | 12 | 860 | 31 | 455 | 34 | 914 | 844 | 18 | Comparative Example 1 |
| Comparative Steel 2 | 10 | 810 | 25 | 449 | 35 | 867 | 797 | 7 | Comparative Example 2 |
| Comparative Steel 3 | 11 | 870 | 45 | 485 | 33 | 960 | 890 | 14 | Comparative Example 3 |
| Comparative Steel 4 | 10 | 800 | 15 | 471 | 30 | 841 | 771 | 35 | Comparative Example 4 |
| Inventive Steel 1 | 11 | 910 | 0 | 462 | 38 | 884 | 814 | 27 | Comparative Example 5 |
| Inventive Steel 2 | 11 | 750 | 31 | 402 | 29 | 872 | 802 | 18 | Comparative Example 6 |
| Inventive Steel 3 | 10 | 830 | 23 | 700 | 12 | 881 | 811 | 23 | Comparative Example 7 |
| Inventive Steel 4 | 10 | 830 | 22 | 100 | 63 | 880 | 810 | 24 | Comparative Example 8 |
| Inventive Steel 5 | 10 | 850 | 30 | 510 | 15 | 912 | 842 | 18 | Comparative Example 9 |
| Inventive Steel 6 | 10 | 850 | 36 | 455 | 39 | 923 | 853 | 35 | Inventive Example 1 |
| Inventive Steel 7 | 11 | 840 | 23 | 499 | 32 | 890 | 820 | 31 | Inventive Example 2 |
| Inventive Steel 8 | 11 | 830 | 15 | 501 | 30 | 860 | 790 | 24 | Inventive Example 3 |
| Inventive Steel 9 | 10 | 850 | 30 | 410 | 40 | 908 | 838 | 31 | Inventive Example 4 |
| Inventive Steel 10 | 10 | 870 | 35 | 443 | 35 | 930 | 860 | 18 | Inventive Example 5 |
| Inventive Steel 11 | 10 | 870 | 30 | 429 | 37 | 917 | 847 | 25 | Inventive Example 6 |
| Inventive Steel 12 | 11 | 860 | 41 | 481 | 32 | 940 | 870 | 29 | Inventive Example 7 |

TABLE 3

| Classification | Phase fraction in surface layer part (% by area) | | | | | | Phase fraction at ½ t of thickness (% by area) | | | | | |
|---|---|---|---|---|---|---|---|---|---|---|---|---|
| | PF | BF + AF | B | M | MA | P | PF | BF + AF | B | M | MA | P |
| Comparative Example 1 | 42 | 29 | 20 | 2 | 1 | 3 | 44 | 25 | 17 | 3 | 1 | 10 |
| Comparative Example 2 | 49 | 31 | 12 | 1 | 6 | 1 | 49 | 30 | 11 | 1 | 8 | 1 |

TABLE 3-continued

| Classification | Phase fraction in surface layer part (% by area) | | | | | | Phase fraction at ½ t of thickness (% by area) | | | | | |
|---|---|---|---|---|---|---|---|---|---|---|---|---|
| | PF | BF + AF | B | M | MA | P | PF | BF + AF | B | M | MA | P |
| Comparative Example 3 | 36 | 33 | 22 | 5 | 1 | 3 | 36 | 31 | 19 | 5 | 1 | 8 |
| Comparative Example 4 | 83 | 10 | 5 | 0 | 1 | 1 | 85 | 9 | 4 | 0 | 1 | 1 |
| Comparative Example 5 | 83 | 10 | 4 | 1 | 1 | 1 | 86 | 9 | 3 | 0 | 1 | 1 |
| Comparative Example 6 | 84 | 9 | 4 | 1 | 1 | 1 | 87 | 8 | 2 | 1 | 1 | 1 |
| Comparative Example 7 | 90 | 5 | 0 | 0 | 0 | 5 | 91 | 1 | 0 | 0 | 0 | 8 |
| Comparative Example 8 | 37 | 24 | 25 | 11 | 2 | 1 | 40 | 28 | 21 | 9 | 1 | 1 |
| Comparative Example 9 | 73 | 20 | 0 | 0 | 1 | 6 | 73 | 16 | 0 | 0 | 1 | 10 |
| Inventive Example 1 | 43 | 40 | 14 | 1 | 1 | 1 | 44 | 41 | 11 | 2 | 1 | 1 |
| Inventive Example 2 | 42 | 41 | 14 | 1 | 1 | 1 | 44 | 41 | 12 | 1 | 1 | 1 |
| Inventive Example 3 | 12 | 40 | 15 | 1 | 1 | 1 | 43 | 40 | 14 | 1 | 1 | 1 |
| Inventive Example 4 | 37 | 43 | 17 | 1 | 1 | 1 | 41 | 40 | 15 | 2 | 1 | 1 |
| Inventive Example 5 | 39 | 45 | 15 | 1 | 0 | 0 | 41 | 42 | 13 | 2 | 1 | 1 |
| Inventive Example 6 | 34 | 47 | 18 | 1 | 0 | 0 | 36 | 46 | 15 | 1 | 1 | 1 |
| Inventive Example 7 | 29 | 49 | 19 | 3 | 0 | 0 | 29 | 49 | 19 | 1 | 1 | 1 |

* In Table 3, P refers to the sum of fractions of pearlite and carbides having a diameter of 0.5 μm or more, observed within a unit area (1 cm$^2$).

TABLE 4

| Classification | YS (MPa) | TS (MPa) | YR | El(%) | Hmax (Hv) | Hmin (Hv) | ΔHv | A* |
|---|---|---|---|---|---|---|---|---|
| Comparative Example 1 | 632 | 761 | 0.83 | 19 | 263 | 190 | 73.03 | 26037 |
| Comparative Example 2 | 483 | 611 | 0.79 | 24 | 211 | 184 | 27.19 | 56953 |
| Comparative Example 3 | 548 | 677 | 0.81 | 34 | 234 | 213 | 21.06 | 127878 |
| Comparative Example 4 | 416 | 507 | 0.82 | 35 | 175 | 149 | 26.24 | 59252 |
| Comparative Example 5 | 412 | 521 | 0.79 | 37 | 180 | 154 | 26.08 | 66553 |
| Comparative Example 6 | 415 | 512 | 0.81 | 34 | 177 | 151 | 25.97 | 59315 |
| Comparative Example 7 | 388 | 479 | 0.81 | 39 | 166 | 141 | 24.56 | 62959 |
| Comparative Example 8 | 556 | 678 | 0.82 | 25 | 234 | 203 | 21.35 | 63361 |
| Comparative Example 9 | 348 | 441 | 0.79 | 40 | 152 | 119 | 33.43 | 40218 |
| Inventive Example 1 | 484 | 598 | 0.81 | 37 | 218 | 202 | 15.23 | 158043 |
| Inventive Example 2 | 486 | 600 | 0.81 | 37 | 218 | 203 | 15.28 | 158871 |
| Inventive Example 3 | 470 | 602 | 0.78 | 36 | 219 | 203 | 16.00 | 148318 |
| Inventive Example 4 | 500 | 610 | 0.82 | 36 | 222 | 206 | 15.53 | 156857 |
| Inventive Example 5 | 568 | 719 | 0.79 | 32 | 262 | 243 | 18.31 | 164343 |
| Inventive Example 6 | 572 | 733 | 0.78 | 32 | 267 | 248 | 18.67 | 167543 |
| Inventive Example 7 | 656 | 841 | 0.78 | 31 | 306 | 290 | 15.95 | 250116 |

*In Table 4, A* is El × TS × 0.5 Hv$_{max}$/ΔH.

As shown in Tables 1 to 4, it was found that Inventive Examples 1 to 7 which satisfied all of the component ranges, the manufacturing conditions, and Relation 1-3 suggested in the present disclosure had the microstructures and material characteristics to be desired.

However, in Comparative Example 1, the C content was out of the range suggested in the present disclosure, and Relation 1 considering segregation exceeded the range of the present disclosure. At this time, it was found that an excessive pearlite structure was formed over the center part and the surface layer part in the microstructure, and thus, ductility was insufficient and the hardness variation between thicknesses was large.

In Comparative Example 2 in which the Si content did not satisfy the ranges of the present disclosure and did not satisfy Relation 1, it was confirmed that a high fraction of the MA phase was formed both in the surface layer part and the central part. This is because a phase transformation temperature was raised by the addition of excessive Si, so that a ferrite phase was formed in the surface layer part during hot rolling and two-phase region was rolled, and some untransformed austenite phases were formed into a MA phase, resulting in deterioration of the elongation.

In Comparative Examples 3 and 4, the component range of Mn was out of the range suggested in the present disclosure, and also Relation 1 was not satisfied. Specifically, in Comparative Example 3, the Mn content was excessively higher, so that the pearlite structure was excessively formed and an elongated MnS inclusion was observed. In particular, when hardness was measured in the thickness direction, a high hardness difference was locally shown and ductility was also insufficient. Further, in Comparative Example 4, the Mn content was small, so that segregation in the thickness direction of the rolled sheet or coarse carbide and non-uniform pearlite structure were not formed, but yield strength and tensile strength were insufficient, and thus, the results departing from the present disclosure were shown.

In Comparative Examples 5 and 6 in which the steel composition component satisfied the ranges of the present disclosure, but the FDT range did not satisfy the ranges of the present disclosure, Comparative Example 5 did not satisfy the target strength due to the formation of coarse polygonal ferrite, while Comparative Example 6 formed coarse polygonal ferrite a lot which was rolled in a two-phase region and elongated to increase structure non-uniformity and also to deteriorate strength.

In Comparative Examples 7 and 8, the coiling temperature standards suggested in the present disclosure were not satisfied. Specifically, in Comparative Example 7 in which the coiling temperature was higher than the range suggested in the present disclosure, a pearlite structure was locally formed in the structure, and, in particular, a pearlite band structure was observed in the thickness center. Therefore, a locally high hardness difference was shown in hardness measurement in the thickness direction. Further, in Comparative Example 8 in which the coiling temperature was lower than the range suggested in the present disclosure, it was confirmed that the elongation was deteriorated by the formation of excessive martensite in the structure.

In Comparative Example 9 in which the cooling rate during cooling after hot rolling was lower than the range suggested in the present disclosure, it was confirmed that the fraction of coarse polygonal ferrite in the structure was high to deteriorate the strength, and also, pearlite and a coarse carbide were formed in the thickness center to cause variation in hardness.

Figure 1:
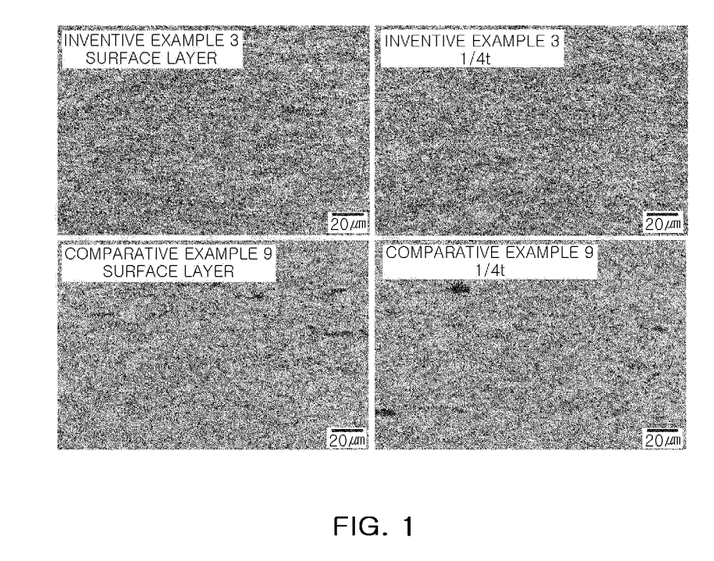
FIG. 1 is photographs illustrating cross-sectional microstructures according to the thickness (surface layer and ¼ t) of the steel sheets of Inventive Example 3 and Comparative Example 9 in an exemplary embodiment in the present disclosure.

Meanwhile, FIG. 1 is photographs illustrating cross-sectional microstructures according to the thickness (surface layer and ¼t) of the steel sheets of Inventive Example 3 and Comparative Example 9 in an exemplary embodiment in the present disclosure. It was found that Inventive Example 3 obtained a more homogeneous structure than Comparative Example 9.

Figure 2:
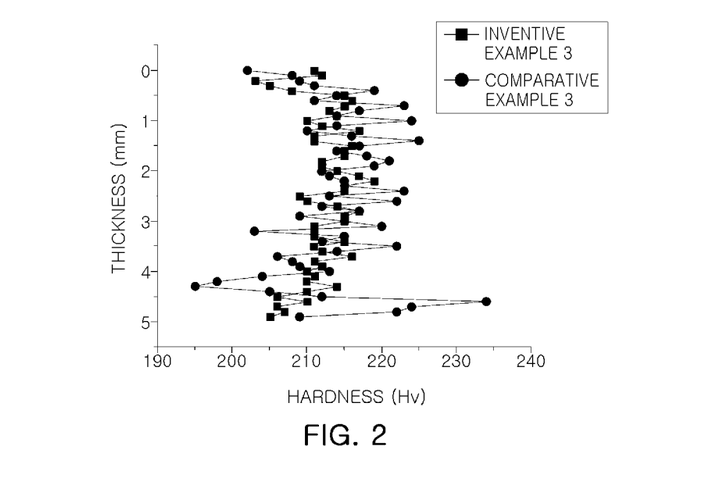
FIG. 2 is a drawing illustrating a hardness value distribution in a thickness cross section of Inventive Example 3 and Comparative Example 3 in an exemplary embodiment in the present disclosure.

Further, FIG. 2 is a drawing illustrating a hardness value distribution in a thickness cross section of Inventive Example 3 and Comparative Example 3 in an exemplary embodiment in the present disclosure. It was found that Inventive Example 3 had a smaller hardness deviation by each thickness than Comparative Example 3.

Figure 3:
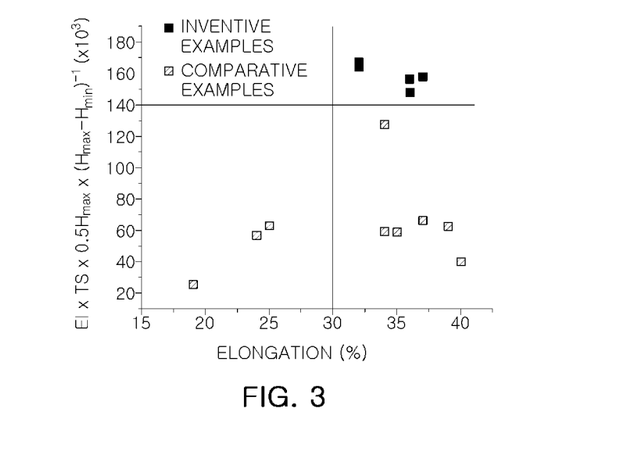
FIG. 3 is a drawing illustrating $El\times TS\times 0.5$ $Hv_{max}/\Delta H$ value distribution for an elongation level of the inventive examples and the comparative examples in an exemplary embodiment in the present disclosure.

FIG. 3 is a drawing illustrating El×TS×0.5 $Hv_{max}/\Delta H$ value distribution for an elongation level of the inventive examples and the comparative examples in an exemplary embodiment in the present disclosure.

As described above, the preferred exemplary embodiments of the present disclosure have been described, various modifications are possible without departing from the scope of the present disclosure by a person skilled in the art to which the present disclosure pertains, of course. Accordingly, the right scope of the present disclosure should not be limited to the exemplary embodiments described, and should be defined by the appended claims and equivalents thereto.

The invention claimed is:

1. A high-strength thick hot-rolled steel sheet having a thickness of 10 to 14 mm, a tensile strength of 590 MPa grade or higher, and an elongation of 30% or more, the hot-rolled steel sheet comprising, by weight:
0.05 to 0.15% of C, 0.01 to 1.0% of Si, 1.0 to 2.0% of Mn, 0.01 to 0.1% of Sol. Al, 0.005 to 1.0% of Cr, 0.001 to 0.02% of P, 0.001 to 0.01% of S, 0.001 to 0.01% of N, 0.005 to 0.07% of Nb, and 0.005 to 0.11% of Ti, with a remainder of Fe and unavoidable impurities,
wherein the hot-rolled steel sheet satisfies the following Relation 1, and has a microstructure comprising, by area: 25 to 50% of polygonal ferrite, 30 to 50% of bainitic ferrite+acicular ferrite; 20% or less of bainite, less than 5% of a sum of area fractions of a pearlite structure and a carbide having a diameter of 0.5 μm or more, observed within a unit area (1 cm$^2$), and less than 5% of a MA phase (martensitic-austenitic constituents):

$$0.3 \leq R \leq 1.0 \text{ and}$$

$$R=[C]*+0.7\times[Mn]+8.5\times[P]+7.5\times[S]-0.9\times[Si]-1.5\times[Nb]$$

$$[C]*=[C]-[C]\times Q$$

$$Q=([Nb]/93+[Ti]/48)/([C]/12) \quad \text{[Relation 1]}$$

wherein C, Mn, P, S, Si, Nb, and Ti are wt % of corresponding alloy elements.

2. The high-strength thick hot-rolled steel sheet of claim 1, wherein the hot-rolled steel sheet satisfies that a value of El×TS×0.5 $Hv_{max}/\Delta H$ is 140,000 or more, and wherein the El is an elongation (%), the TS is a tensile strength (MPa), and the $\Delta H$ is defined by ($Hv_{max}-Hv_{min}$) where the $Hv_{max}$ is a highest Vickers hardness value and the $Hv_{min}$ is a lowest Vickers hardness value when measured using a Micro-Vickers hardness tester under a load of 500 g along a thickness direction of the hot-rolled steel sheet at 0.5 mm intervals from a surface layer of the hot-rolled steel sheet (1 mm directly under a surface of the hot-rolled steel sheet) to a point of ½ thickness of the hot-rolled steel sheet.

3. A method for manufacturing a high-strength thick hot-rolled steel sheet having a thickness of 10 to 14 mm, a tensile strength of 590 MPa grade or higher, and an elongation of 30% or more, the method comprising:
reheating a steel slab to 1200 to 1350° C., the steel slab including, by weight: 0.05 to 0.15% of C, 0.01 to 1.0% of Si, 1.0 to 2.0% of Mn, 0.01 to 0.1% of Sol. Al, 0.005 to 1.0% of Cr, 0.001 to 0.02% of P, 0.001 to 0.01% of S, 0.001 to 0.01% of N, 0.005 to 0.07% of Nb, and 0.005 to 0.11% of Ti, with a remainder of Fe and unavoidable impurities and satisfying the following Relation 1;
finish hot rolling the reheated steel slab in a temperature range satisfying the following Relation 2;
cooling the finish hot rolled steel sheet to a temperature in a range of 450 to 550° C. at a cooling rate satisfying the following Relation 3 and then coiling the cooled steel sheet at a temperature in a range of 400 to 550° C.; and
air cooling or water cooling the coiled steel sheet to a temperature in a range of room temperature to 200° C.:

$0.3 \leq R \leq 1.0$ and $R = [C]^* + 0.7 \times [Mn] + 8.5 \times [P] + 7.5 \times [S] - 0.9 \times [Si] - 1.5 \times [Nb]$ $[C]^* = [C] - [C] \times Q$ $Q = ([Nb]/93 + [Ti]/48)/([C]/12)$   [Relation 1]

wherein C, Mn, P, S, Si, Nb, and Ti are wt % of corresponding alloy elements, $Tn - 70 \leq FDT \leq Tn$ $Tn = 750 + 92 \times [C] + 70 \times [Mn] + 45 \times [Cr] + 647 \times [Nb] + 515 \times [Ti] - 50 \times [Si] - 2.4 \times (t-5)$   [Relation 2]

wherein C, Mn, Cr, Nb, Ti, and Si are wt % of corresponding alloy elements, FDT is a temperature (° C.) of a hot-rolled sheet at the end of hot rolling, and t is a thickness (mm) of a final rolled sheet material, $CR_{Min} \leq CR^* \leq 60$ $CR_{Min} = 65 - 157 \times [C] - 25.2 \times [Si] - 14.1 \times [Mn] - 27.3 \times [Cr] + 61 \times [Ti] + 448 \times [Nb] + 1.4 \times (t-5)$   [Relation 3]

wherein C, Si, Mn, Cr, Ti, and Nb are wt % of corresponding alloy elements, and
CR* is a cooling rate (° C./sec) during cooling of a sheet material rolled after hot rolling.

4. The method of claim 3, further comprising: pickling and oiling the air-cooled steel sheet or the water-cooled steel sheet.

5. The method of claim 3, wherein the hot-rolled steel sheet has a microstructure comprising, by area: 25 to 50% of polygonal ferrite, 30 to 50% of bainitic ferrite+acicular ferrite; 20% or less of bainite, less than 5% of a sum of area fractions of a pearlite structure and a carbide having a diameter of 0.5 µm or more, observed within a unit area (1 cm$^2$), and 5% or less of a MA phase (martensitic-austenitic constituents), and satisfies that a value of El×TS×0.5 Hv$_{max}$/ΔH is 140,000 or more, and wherein the El is an elongation (%), the TS is a tensile strength (MPa), and the ΔH is defined by (Hv$_{max}$−Hv$_{min}$) where the Hv$_{max}$ is a highest Vickers hardness value and the Hv$_{min}$ is a lowest Vickers hardness value when measured using a Micro-Vickers hardness tester under a load of 500 g along a thickness direction of the hot-rolled steel sheet at 0.5 mm intervals from a surface layer of the hot-rolled steel sheet (1 mm directly under a surface of the hot-rolled steel sheet) to a point of ½ thickness of the hot-rolled steel sheet.

6. The method of claim 3, wherein a reduction amount is controlled to 10 to 60% within the finish hot rolling temperature range.

* * * * *